United States Patent
Behmo et al.

(10) Patent No.: US 9,672,442 B2
(45) Date of Patent: Jun. 6, 2017

(54) METHOD AND A DEVICE FOR DETECTING DIFFERENCES BETWEEN TWO DIGITAL IMAGES

(71) Applicant: LTU TECHNOLOGIES, Paris (FR)

(72) Inventors: Régis Behmo, Paris (FR); Fabien Freling, Boulogne (FR); Yannick Allusse, Paris (FR); Simon Dolle, Levallois (FR)

(73) Assignee: LTU TECHNOLOGIES, Paris (FR)

( * ) Notice: Subject to any disclaimer, the term of this patent is extended or adjusted under 35 U.S.C. 154(b) by 14 days.

(21) Appl. No.: 14/430,082

(22) PCT Filed: Sep. 21, 2012

(86) PCT No.: PCT/IB2012/002177
§ 371 (c)(1),
(2) Date: Mar. 20, 2015

(87) PCT Pub. No.: WO2014/045076
PCT Pub. Date: Mar. 27, 2014

(65) Prior Publication Data
US 2015/0242705 A1    Aug. 27, 2015

(51) Int. Cl.
*G06K 9/00* (2006.01)
*G06K 9/62* (2006.01)
(Continued)

(52) U.S. Cl.
CPC ......... *G06K 9/6215* (2013.01); *G06K 9/4652* (2013.01); *G06K 9/52* (2013.01);
(Continued)

(58) Field of Classification Search
CPC ...... G06K 9/6215; G06K 9/4652; G06K 9/52; G06K 9/6224; G06K 9/6202; G06T 3/00;
(Continued)

(56) References Cited

U.S. PATENT DOCUMENTS

| 6,182,069 B1 | 1/2001 | Niblack et al. |
| 2007/0292008 A1 | 12/2007 | Yumoto et al. |
| 2009/0141967 A1 | 6/2009 | Hattori |

FOREIGN PATENT DOCUMENTS

DE    102010005266 A1    7/2011

OTHER PUBLICATIONS

Jun. 11, 2013 Search Report issued in International Application No. PCT/IB2012/002177.
(Continued)

*Primary Examiner* — Andrew Moyer
(74) *Attorney, Agent, or Firm* — Oliff PLC; R. Brian Drozd (57) ABSTRACT

A method for detecting differences between two digital images includes the steps of: transforming the images by resizing the images in order to get identical image sizes, by aligning pixels of the images and by normalizing colors of the images; determining plural binary masks from the pixels of the transformed images, each binary mask being composed of one element per couple of pixels of the transformed images having same coordinates; determining plural energy functions, each energy function being the sum of a first term representative of transformed images and of one binary mask and of a second term which is only dependent on said one binary mask; minimizing the energy function over other plural energy functions; and selecting the binary mask corresponding to the minimized energy function.

10 Claims, 3 Drawing Sheets

(51) Int. Cl.
  *G06T 7/00*   (2017.01)
  *G06K 9/46*   (2006.01)
  *G06K 9/52*   (2006.01)
  *G06T 3/00*   (2006.01)
  *G06T 7/33*   (2017.01)
  *G06T 7/90*   (2017.01)

(52) U.S. Cl.
  CPC .......... *G06K 9/6202* (2013.01); *G06K 9/6224* (2013.01); *G06T 3/00* (2013.01); *G06T 7/0008* (2013.01); *G06T 7/337* (2017.01); *G06T 7/90* (2017.01); *G06T 2207/10024* (2013.01); *G06T 2207/20036* (2013.01)

(58) Field of Classification Search
  CPC ....... G06T 7/408; G06T 7/0008; G06T 7/003; G06T 2207/20036; G06T 2207/10024
  USPC .......................... 382/162, 165, 167, 218–222
  See application file for complete search history.

(56) References Cited

OTHER PUBLICATIONS

Jun. 11, 2013 Written Opinion issued in International Application No. PCT/IB2012/002177.

METHOD AND A DEVICE FOR DETECTING DIFFERENCES BETWEEN TWO DIGITAL IMAGES

FIELD OF THE INVENTION

The present invention relates generally to a method and a device for detecting differences between two digital images.

In parallel with the explosion of paper media and the number of information support, media monitoring companies grown in importance. Media monitoring companies aggregate, structure and measure the available information.

However, despite the volume explosion, monitoring tasks are poorly automated. In the print monitoring field, most of the work is still made by operators who manually browse freshly printed newspapers and magazines. The data operators collect are of different nature.

For example, the operators identify each ad printed in the magazines. For each of them, the operators record the concerned society, the concerned product, the ad format as well as the exact version of the ad.

For a given ad campaign, the posters are often declined in numerous variants. For example, the price may vary, the general conditions of sale may change, or the advertiser may propose a promotion for a limited duration or the brand may change. The operators have to accurately and visually identify each of the differences.

BACKGROUND OF THE INVENTION

The recorded data are very valuable to the advertisers as the recorded data allow advertisers to check if their communication campaign is performed as they expect.

The recorded data are also interesting for competitors as the recorded data may allow them to estimate the communication budget of one competitor.

In order to reduce costs and inaccurate manual browsing, monitoring companies are automating the browsing process. Image recognition technology may be a solution for automating the browsing process. Image detection algorithms are able to find an image in a large collection of images. Image detection algorithms may find all the images related to a given ad campaign but are not able to detect small differences between images. The operators are still required to manually select the appropriate record.

SUMMARY

The present invention aims at providing a method and a device which enable to detect fine differences between two digital images.

To that end, the present invention concerns a method for detecting differences between two digital images, characterized in that the method comprises the steps of:
  transforming the images by resizing the images in order to get identical image sizes, by aligning pixels of the images and by normalizing colours of the images,
  determining plural binary masks from the pixels of the transformed images, each binary mask being composed of one element per couple of pixels of the transformed images having same coordinates in the images.
  determining plural energy functions, each energy function being the sum of a first term which is representative of the transformed images and of one binary mask and of a second term which is only dependent on said one binary mask,
  minimizing the energy function over other plural energy functions,
  selecting the binary mask corresponding to the minimized energy function, each element value being representative of the difference or not of the pixel values of the couple of pixels.

The present invention concerns also a device for detecting differences between two digital images, characterized in that the device comprises:
  means for transforming the images by resizing the images in order to get identical image sizes, by aligning pixels of the images and by normalizing colours of the images,
  means for determining plural binary masks from the pixels of the transformed images, each binary mask being composed of one element per couple of pixels of the transformed images having same coordinates in the images,
  means for determining plural energy functions, each energy function being the sum of a first term which is representative of the transformed images and of one binary mask and of a second term which is only dependent on said one binary mask,
  means for minimizing the energy function over other plural energy functions,
  means for selecting the binary mask corresponding to the minimized energy function, each element value being representative of the difference or not of the pixel values of the couple of pixels.

Thus, it is possible to detect fine differences between two images.

By resizing the images in order to get identical image sizes, by aligning pixels of the images and by normalizing colours of the images, the present invention minimizes geometric transformations, such as rotation, scaling or perspective transformations that may occur during digitization process, colours artefacts that may come from the image printing and digitization process.

According to a particular feature, the method comprises further steps of:
  determining connected components in the selected binary mask,
  determining a score for each of the determined connected components, the score being dependent on colour distances between pixels of the couple of pixels corresponding to element of the selected mask belonging to the connected component,
  selecting the maximum score,
  displaying the maximum score.

Thus, if the score is null it is possible to declare that the images have no difference. Otherwise the score provides a cue of the amount of difference between the two images. Using the maximum score of the connected component as the final score let the user discriminate images with high intensity differences, even if very small from the images with low intensity differences. This is interesting since low intensity differences often come from artifacts while high intensity differences are most of the time the result of a change in content.

According to a particular feature, the method comprises the step of displaying information enabling a visual identification of the differences between the two images.

Thus, it is possible, for example to a user, to clearly identify which parts of the images are different.

According to a particular feature, the first term is determined according to the following formula:

$$\sum_{(x,y)\in L} D(I_{N1}(x, y), I'_{N2}(x, y), M(x, y))$$

With $$D(I_{N1}(x, y), I'_{N2}(x, y), M(x, y)) = \begin{cases} d & \text{if } M(x, y) = 1 \\ \mu \cdot d_{color}(I_{N1}(x, y), I'_{N2}(x, y)) & \text{otherwise} \end{cases}$$

$$d_{color}(I_{N1}(x, y), I'_{N2}(x, y)) = \sqrt{\sum_{i=1}^{3} 2\frac{(I_{N1}(x, y)(i) - I'_{N2}(x, y)(i))^2}{(|I_{N1}(x, y)(i)| + |I'_{N2}(x, y)(i)|)}},$$

$$(I_{N1}(x, y), I'_{N2}(x, y)) \in \mathcal{R}^3 \times \mathcal{R}^3$$

wherein L is the set of all the pixel locations in transformed images, where $I_{N1}(x, y)$ is the pixel value at position (x,y) of a transformed image and $I_{N2}(x,y)$ is the pixel value at position (x,y) of the other transformed image, M(x,y) is the element value of the binary mask at position (x,y), d is a predetermined scalar value, μ is a predetermined scalar value, $I_{N1}(x,y)$ (i) is the $i^{th}$ element of the triplet of colour of $I_{N1}(x,y)$ and $I_{N2}'(x,y)$ (i) is the $i^{th}$ element of the triplet of colours of $I_{N2}'(x,y)$, i is an indicia of a channel colour.

Thus, all the colour channel values are taken into account in the distance computation. Moreover, the normalization of the pixel distance by the sum of absolute pixel values prevents strongly saturated colour channels from disproportionally affecting the pixel distance value.

According to a particular feature, d=0.8 and μ=0.4.

Thus, the detection of differences is improved.

According to a particular feature, the second term is determined according to the following formula:

$$\sum_{(x,y)\in L} \sum_{(x',y')\in N(x,y)} v(M(x, y), M(x', y'))$$

With $$v(l_1, l_2) = \begin{cases} \varepsilon & \text{if } l_1 \neq l_2 \\ 0 & \text{otherwise} \end{cases}$$

Wherein N(x,y) is the 4-neighborhood of position (x,y) and ε is a predetermined value.

This smoothing constraint thus prevents the appearance of very small difference regions that might typically be caused by image noise, such as jpeg compression noise or paper texture.

According to a particular feature, ε=0.4.

Thus, the detection of differences is improved.

According to a particular feature, for each of the determined connected components, the score is determined according to the following formula:

$$score'(CC_k) = \sum_{(x,y)\in CC_k} d_{color}(I_{N1}(x, y), I'_{2N}(x, y))$$

Wherein $CC_k$ is the k-th connected component.

This means that we consider connected or neighbouring pixels as belonging to the same difference region. The more pixels in this region is, the greater the score is.

Thus, a higher score means a greater likelihood of a difference region.

The present invention also concerns, in at least one embodiment, a computer program that can be downloaded from a communication network and/or stored on a medium that can be read by a computer or processing device. This computer program comprises instructions for causing implementation of the aforementioned method, or any of its embodiments, when said program is run by a processor.

The present invention also concerns an information storage means, storing a computer program comprising a set of instructions causing implementation of the aforementioned method, or any of its embodiments, when the stored information is read from said information storage means and run by a processor.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
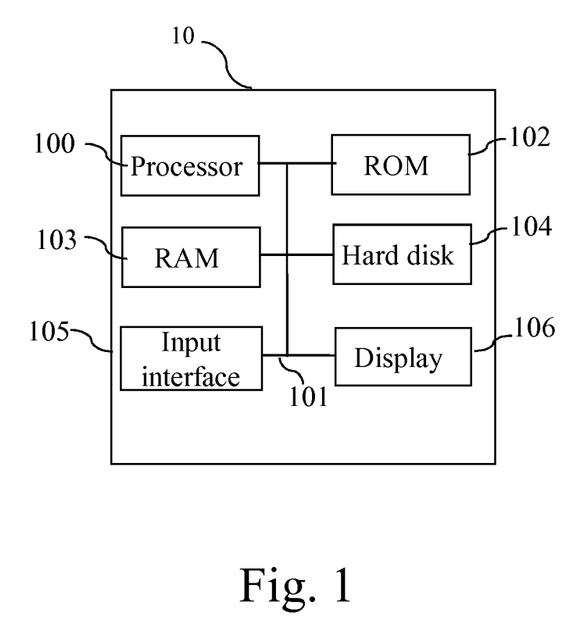
FIG. 1 is an example of a device for identifying differences between two images.

FIG. 1 is an example of a device for identifying differences between two images.

According to the shown architecture, the device 10 comprises the following components interconnected by a communication bus 101: a processor, microprocessor, microcontroller or CPU (Central Processing Unit) 100; a RAM (Random-Access Memory) 103; a ROM (Read-Only Memory) 102; a hard disk 104 or any other device adapted to store images, a display 106 and an input interface 105.

CPU 100 is capable of executing instructions loaded into RAM 103 from ROM 102 or from an external memory, such as an SD card. After the device 10 has been powered on, CPU 100 is capable of reading instructions from RAM 103 and executing these instructions. The instructions form one computer program that causes CPU 100 to perform some or all of the steps of the algorithm described hereafter with regard to FIG. 2.

Figure 2:
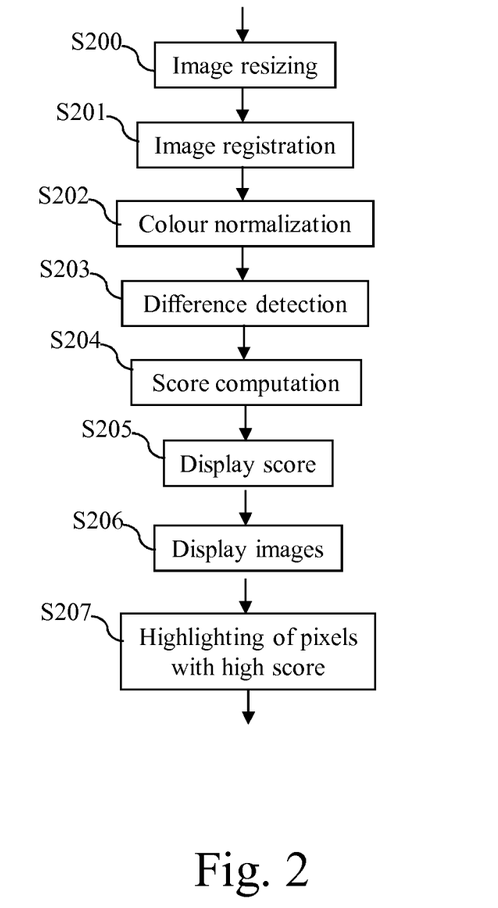
FIG. 2 is an example of an algorithm for identifying differences between two images.

Any and all steps of the algorithm described hereafter with regard to FIG. 2 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the device 10 includes circuitry, or a device including circuitry, causing the device 10 to perform the steps of the algorithm described hereafter with regard to FIG. 2.

From the input interface 105, the CPU 100 receives images to be compared. The input interface may be connected to a scanner, or to a data base.

It has to be noted here that the display 106 may not be included in the device 10 and may be linked to the device 10 through a communication link.

According to the invention, the device 10 comprises:
means for transforming the images by resizing the images in order to get identical image sizes, by aligning pixels of the images and by normalizing colours of the images,
means for determining plural binary masks from the pixels of the transformed images, each binary mask being composed of one element per couple of pixels of the transformed images having same coordinates in the images, —means for determining plural energy functions, each energy function being the sum of a first term which is representative of the transformed images and of one binary mask and of a second term which is only dependent on said one binary mask,
means for minimizing the energy function over other plural energy functions,
means for selecting the binary mask corresponding to the minimized energy function, each element value being representative of the difference or not of the pixel values of the couple of pixels.

FIG. 2 is an example of an algorithm for identifying differences between two images.

At step S200, the CPU 100 performs on each image noted $I_1$ and $I_2$ to be compared an image resizing. Images $I_{m1}$ and $I_{m2}$ are resized in order to bring them to the same dimensions, measured in number of pixels. For example, images $I_{m1}$ and $I_{m2}$ are resized such that the larger dimension of each image is equal to a predefined number of pixels. For example, the predefined number of pixels is equal to 400.

The resized image of $I_{m1}$ is noted $I_{R1}$ and the resized image of $I_{m2}$ is noted $I_{R2}$. The image resizing that transforms $I_{m1}$ into $I_{R1}$ is named $R_1$. The image resizing that transforms $I_{m2}$ into $I_{R2}$ is named $R_2$.

At next step S201, the CPU 100 performs an image registration in order to transform images $I_{R1}$ and $I_{R2}$ into one coordinate system. Image registration can be done with any kind of image registration technique. In a preferred implementation, the algorithm uses feature based techniques as described in the paper of Zitova, entitled "Image Registration Methods: a survey," published Image and Vision Computing, 2003. The CPU 100, detects interest point in the images, computes robust region descriptors from them. For instance, robust region descriptors are as the one mentioned in the paper of K. Mikolajczyk, C. Schmid, entitled "A performance evaluation of local descriptors" published in IEEE Pattern Anal. Mach. Intell. (PAMI) 27, 10 (2005), pages 1615-1630. Then the CPU 100 executes a RANdom SAmple Consensus method in order to determine a transformation noted H that maps the image $I_{R2}$ into the image $I_{R1}$. The CPU 100 applies the transformation H to $I_{R2}$ in order to get the registered image $I_{R2}'$.

The image registration removes misalignment artifacts and rotation due to image scanning.

At next step S202, the CPU 100 performs a colour normalization to the images $I_{R1}$ and $I_{R2}'$.

For example, if $I_{R1,1}$, $I_{R1,2}$, $I_{R1,3}$ are the three RGB colour channels of image $I_{R1}$, $I_{R2',1}$, $I_{R2',2}$, $I_{R2',3}$ are the three RGB colour channels of image $I_{R2'}$. It should be noted that the normalization step is independent of the number of image channels.

The colour normalized version $I_{N1}$ of $I_{R1}$ is the image which colour channels are colorNorm($I_{R1,1}$), colorNorm($I_{R1,2}$), colorNorm($I_{R1,3}$).

$$colorNorm(I_{R1,1})(x, y) = \frac{I_{R1,1}(x, y) - \text{mean}(I_{R1,1})}{stdev(I_{R1,1})}$$

where mean($I_{R1,1}$) is the mean pixel value of the channel $I_{R1,1}$, $I_{R1,1}(x,y)$ is the pixel value of $I_{R1,1}$ at position (x,y), colorNorm($I_{R1,1}$)(x,y) is the colour channel value at position (x,y) and stdev($I_{R1,1}$) is the standard deviation of the pixel values of $I_{R1,1}$. This normalization is also called z-score normalization.

$$colorNorm(I_{R1,2})(x, y) = \frac{I_{R1,2}(x, y) - \text{mean}(I_{R1,2})}{stdev(I_{R1,1})}$$

where mean($I_{R1,2}$) is the mean pixel value of the channel $I_{R1,2}$, $I_{R1,2}(x,y)$ is the pixel value of $I_{R1,2}$ at position (x,y), colorNorm($I_{R1,2}$)(x,y)) is the colour channel value at position (x,y) and stdev($I_{R1,2}$) is the standard deviation of the pixel values of $I_{R1,2}$.

$$colorNorm(I_{R1,3})(x, y) = \frac{I_{R1,3}(x, y) - \text{mean}(I_{R1,3})}{stdev(I_{R1,3})}$$

where mean($I_{R1,3}$) is the mean pixel value of the channel $I_{R1,3}$, $I_{R1,3}(x,y)$ is the pixel value of $I_{R1,3}$ at position (x,y), colorNorm($I_{R1,3}$)(x,y) is the colour channel value at position (x,y) and stdev($I_{R1,3}$) is the standard deviation of the pixel values of $I_{R1,3}$.

In a similar way we compute the colour normalized version $I_{N2}'$ from $I_{R2}'$.

The colour normalized version $I_{N2}'$ of $I_{R2}'$ is the image which colour channels are colorNorm($I_{R2',1}$), colorNorm($I_{R2',2}$), colorNorm($I_{R2',3}$).

$$colorNorm(I_{R2',1})(x, y) = \frac{I_{R2',1}(x, y) - \text{mean}(I_{R2',1})}{stdev(I_{R1,1})}$$

where mean($I_{R2',1}$) is the mean pixel value of the channel $I_{R2',1}$, $I_{R2',1}(x,y)$ is the pixel value of $I_{R2',1}$ at position (x,y) is the colour channel value at position (x,y) and stdev($I_{R2',1}$) is the standard deviation of the pixel values of $I_{R2',1}$.

$$colorNorm(I_{R2',2})(x, y) = \frac{I_{R2',2}(x, y) - \text{mean}(I_{R2',2})}{stdev(I_{R1,1})}$$

where mean($I_{R2',2}$) is the mean pixel value of the channel $I_{R2',2}$, $I_{R2',2}(x,y)$ is the pixel value of $I_{R2',2}$ at position (x,y), colorNorm($I_{R2',2}$)(x,y) is the colour channel value at position (x,y) and stdev($I_{R2',2}$) is the standard deviation of the pixel values of $I_{R2',2}$.

$$colorNorm(I_{R2',3})(x, y) = \frac{I_{R2',3}(x, y) - \text{mean}(I_{R2',3})}{stdev(I_{R2',3})}$$

where mean($I_{R2',3}$) is the mean pixel value of the channel $I_{R2',3}$, $I_{R2',3}(x,y)$ is the pixel value of $I_{R2',3}$ at position (x,y), colorNorm($I_{R2',3}$)(x,y) is the colour channel value at position (x,y) and stdev($I_{R2',3}$) is the standard deviation of the pixel values of $I_{R2',3}$.

The colour normalization minimizes the colour artifacts that may come from the image printing and digitalization processes. At output of colour normalization, two images are obtained $I_{N1}$ from $I_{R1}$ and $I_{N2}'$ from $I_{R2}'$.

$I_{N1}$ and $I_{N2}'$ have the same dimensions, are registered and colour normalized.

At step S203, the CPU 100 performs a difference detection on the images $I_{N1}$ and $I_{N2'}$.

For that an energy function f is defined for each possible binary mask. The energy function depends on the binary mask M, on $I_{N1}$ and on $I_{N2'}$. The function f returns an energy as output. The binary mask M is a single-channel image that has the same dimension as the images $I_{N1}$ and $I_{N2'}$. Each pixel of each binary mask M can take the null or one value. The energy function f is the sum of two terms, a data term and a regularization term.

We define $L_{N1}$ as $[0,w_1[ \times [0,h_1[$ where $w_1,h_1$ are the dimensions of $I_{N1}$. In other words $L_{N1}$ is the set of all the pixel locations in $I_{N1}$. In a similar way we define $L_{N2}$ as the set of all the pixel locations in $I_{N2}'$. As $I_{N1}$ and $I_{N2}'$ have the same dimensions $L_{N1}=L_{N2}'$. In the rest of the description we will refer them as L.

The data term is a sum over all possible locations $(x,y) \in L$ of a sub term that depends only on the $I_{N1}(x,y)$, $I_{N2}'(x,y)$ and $M(x,y)$ where $I_{N1}(x,y)$ is the pixel value of $I_{N1}$ at position (x,y) and $I_{N2'}(x,y)$ is the pixel value of $I_{N2'}$ at position (x,y). It has the following expression:

$$\sum_{(x,y) \in L} D(I_{N1}(x,y), I_{N2}'(x,y), M(x,y))$$

With $$D(I_{N1}(x,y), I_{N2}'(x,y), M(x,y)) = \begin{cases} d & \text{if } M(x,y)=1 \\ \mu \cdot d_{color}(I_{N1}(x,y), I_{N2}'(x,y)) & \text{otherwise} \end{cases}$$

$$d_{color}(I_{N1}(x,y), I_{N2}'(x,y)) = \sqrt{\sum_{i=1}^{3} 2 \frac{(I_{N1}(x,y)(i) - I_{N2}'(x,y)(i))^2}{(|I_{N1}(x,y)(i)| + |I_{N2}'(x,y)(i)|)}} ,$$

$$(I_{N1}(x,y), I_{N2}'(x,y)) \in \mathcal{R}^3 \times \mathcal{R}^3$$

Where $I_{N1}(x,y)(i)$ is the $i^{th}$ element of the triplet of colours of $I_{N1}(x,y)$ and $I_{N2}'(x,y)(i)$ is the $i^{th}$ element of the triplet of colours of $I_{N2}'(x,y)$ with i=1 to 3.

The data term ensures that the binary mask M fits the differences between $I_{N1}$ and $I_{N2}'$.

The form of $d_{color}$ ensures a consistent pixel distance measure. The normalization $|I_{N1}(x,y)(i)|+|I_{N2}(x,y)(i)|$ allows pixels with high intensity to have larger range variations.

In a preferred implementation d=0.8 and µ=0.4. These parameters have proven to provide a good tradeoff between detection efficiency and robustness to noise.

The regularization term is independent from the images $I_{N1}$ and $I_{N2}'$. It only depends on the binary mask M and penalizes sudden label changes. The regularization term has the expression:

$$\sum_{(x,y) \in L} \sum_{(x',y') \in N(x,y)} v(M(x,y), M(x',y'))$$

With $$v(l_1, l_2) = \begin{cases} \varepsilon & \text{if } l_1 \neq l_2 \\ 0 & \text{otherwise} \end{cases}$$

N(x,y) is the 4-neighborhood of position (x,y) i.e. the set {(x−1, y), (x+1,y), (x,y−1), (x,y+1)}.

In a preferred implementation $\varepsilon=0.4$

The regularization term promotes binary masks with low number of label changes.

Once the energy function f is defined of each possible binary mask, the algorithm minimizes it over the set of all possible binary masks that can be defined thanks to a mathematical solver.

In a preferred implementation the CPU 100 uses, as a solver, a GraphCut algorithm as disclosed in the paper of Kolmogorov and Zabih, entitled "Visual correspondences with occlusions using graphs," and published in the Proceedings of ICCV, 2001.

It is possible to use a GraphCut algorithm since the regularization term satisfies the constraint $v(0,0)+v(1,1) \leq v(0,1)+v(1,0)$.

The solution binary mask corresponding to the minimized function is the result difference mask. For each pixel of the solution binary mask M, if it equals null, the images are considered identical at the pixel location otherwise they are considered as different. The result difference mask locates the differences between the two images. At this step, it is possible to compute the difference mask for the image $I_{R2}$ by applying the inverse transformation of H—the transformation that transforms $I_{R2}$ into $I_{R2}'$—named $H^{-1}$—on M. The resulting image is named $H^{-1}(M)$. Then it is possible to compute the difference mask for the original image $I_{m2}$ by applying the inverse transformation of $R_2$—named $R_2^{-1}$ on $H^{-1}(M)$.

In a similar way, it is possible to compute the difference mask for the image $I_{m1}$ by applying the inverse transformation of $R_1$—the image resizing that transforms $I_{m1}$ into $I_{R1}$—named $R_1^{-1}$ on M. The resulting image is named $R_1^{-1}(M)$.

At next step S204, the CPU 100 computes a score score($I_{N1}$, $I_{N2}'$) to quantify the differences between the two images $I_{N1}$ and $I_{N2}'$.

The CPU 100 computes the different connected components $CC_k$ of ones in M thanks to a connected component labeling algorithm.

Connected-component labeling, alternatively connected-component analysis, blob extraction, region labeling, blob discovery, or region extraction, is an algorithmic application of graph theory, where subsets of connected components are uniquely labeled based on a given heuristic.

Connected-component labeling is used in computer vision to detect connected regions in binary digital images, although color images and data with higher-dimensionality can also be processed.

A connected component of ones is a set of pixels that fulfills the following two conditions. The first condition is that each pixel of the connected component has the value 1. The second condition is that each pixel of the connected component is connected to each of the pixel of the connected component by a path made of pixels that belong to the connected component. The connected component is not included in a larger set of pixels that fulfills the first and second conditions i.e. is not included in a larger connected component.

For each of the connected components $CC_k$, the CPU 100 computes a score'($CC_k$). The score of a connected component is the sum of the pixel value distance between $I_{N1}$ and $I_{N2}'$ for all the locations that belong to the connected component.

$$\text{score}'(CC_k) = \sum_{(x,y) \in CC_k} d_{color}(I_{N1}(x, y), I'_{2N}(x, y))$$

The final score is the score of the connected component that has the maximum score.

$$\text{score}(I_{N1}, I'_{N2}) = \max_k (\text{score}'(CC_k))$$

As a special case, the score is null if there are no connected components of ones in M.

This formulation of score($I_{N1}, I_{N2}'$) ensures that if at least a difference region has a high score, the final score is high.

At next step S205, CPU 100 commands the displaying of the final score.

At next step S206, CPU 100 commands the displaying of the image $I_{m1}$ and of the registered image $I_{m2}$.

At next step S207, CPU 100 commands, in at least one of the displayed images or in a new image, the highlighting or the superimposing of the pixels which are different from the displayed images. In a preferred implementation, the pixels that have not been detected as different are greyed, the intensity of the pixels that have been detected as different remains unchanged. Each connected component is circled. The intensity of the pixels that belong to the circles remains unchanged.

Figure 3A:
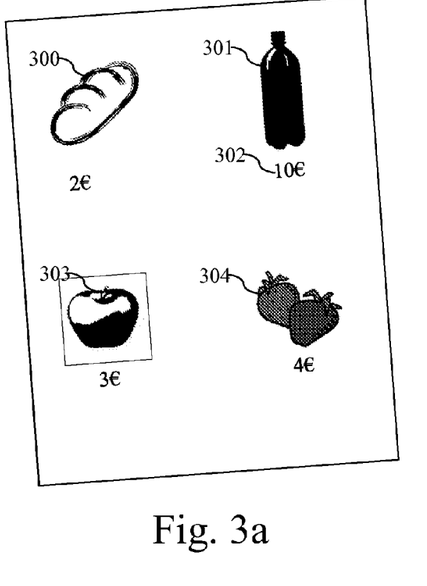
FIGS. 3a and 3b give example of two images processed by the present invention.
Figure 3B:
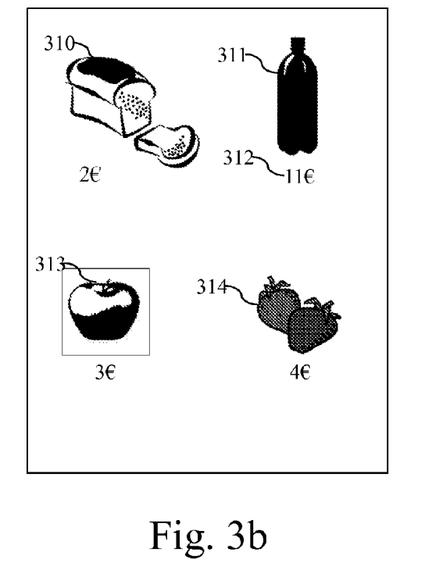

FIGS. 3a and 3b give example of two images processed by the present invention.

FIG. 3a represents an image to be compared to a reference image shown in FIG. 3b.

Image shown in FIG. 3a is rotated due to scanning process.

Examples of FIGS. 3a and 3b are, for example, advertising pages published in magazines.

In FIG. 3a, a French stick 300, a bottle 301, an apple 303 and strawberries 304 are shown. The French stick 300 price is equal to 2 Euros, the bottle price 302 is equal to 10 Euros, the apple price is equal to 3 Euros and strawberries price is equal to 4 Euros.

In FIG. 3b, a brioche 310, a bottle 311, an apple 313 and strawberries 314 are shown. The brioche 310 price is equal to 2 Euros, the bottle price 312 is equal to 11 Euros, the apple price is equal to 3 Euros and strawberries price is equal to 4 Euros.

Figure 4:
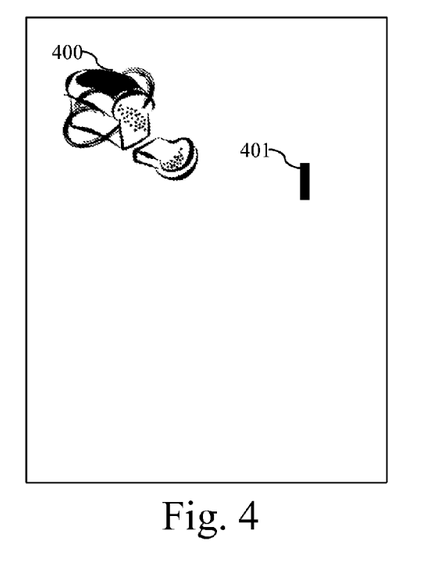
FIG. 4 is an example of differences identified between the two images of FIGS. 3a and 3b by the present invention.

FIG. 4 is an example of differences identified between the two images of FIGS. 3a and 3b by the present invention.

The FIG. 4 shows the differences between the images of FIGS. 3a and 3b.

As the brioche 310 of FIG. 3b is replaced by a French stick 300 in FIG. 3a, the different pixels 400 forming the French stick 300 and the brioche 310 are displayed in FIG. 4.

As the price of the bottle 311 is modified in FIG. 3a, the different pixels 401 forming the prices c302 and 312 are displayed in FIG. 4.

Naturally, many modifications can be made to the embodiments of the invention described above without departing from the scope of the present invention.

The invention claimed is:

1. Method for detecting differences between two images, wherein the method comprises the steps of:
   transforming the images by resizing the images in order to get identical image sizes, by aligning pixels of the images and by normalizing colours of the images,
   determining plural binary masks from the pixels of the transformed images, each binary mask being composed of one element per couple of pixels of the transformed images having same coordinates in the images,
   determining plural energy functions, each energy function being the sum of a first term which is representative of the transformed images and of one binary mask and of a second term which is only dependent on said one binary mask,
   minimizing the energy function over other plural energy functions,
   selecting the binary mask corresponding to the minimized energy function.

2. Method according to claim 1, wherein the method comprises further steps of:
   determining connected components in the selected binary mask,
   determining a score for each of the determined connected components, the score being dependent on colour distances between pixels of the couple of pixels corresponding to element of the selected mask belonging to the connected component,
   selecting the maximum score,
   displaying the maximum score.

3. Method according to claim 1, wherein the method comprises the step of displaying information enabling a visual identification of the differences between the two images.

4. Method according to claim 2, wherein the first term is determined according to the following formula:

$$\sum_{(x,y) \in L} D(I_{N1}(x, y), I'_{N2}(x, y), M(x, y))$$

With $$D(I_{N1}(x, y), I'_{N2}(x, y), M(x, y)) = \begin{cases} d & \text{if } M(x, y) = 1 \\ \mu \cdot d_{color}(I_{N1}(x, y), I'_{N2}(x, y)) & \text{otherwise} \end{cases}$$

$$d_{color}(I_{N1}(x, y), I'_{N2}(x, y)) = \sqrt{\sum_{i=1}^{3} 2 \frac{(I_{N1}(x, y)(i) - I'_{N2}(x, y)(i))^2}{(|I_{N1}(x, y)(i)| + |I'_{N2}(x, y)(i)|)}},$$

$$(I_{N1}(x, y), I'_{N2}(x, y)) \in \mathcal{R}^3 \times \mathcal{R}^3$$

wherein L is the set of all the pixel locations in transformed images, where $I_{N1}(x, y)$ is the pixel value at position (x,y) of a transformed image and $I_{N2'}(x, y)$ is the pixel value at position (x, y) of the other transformed image, M(x,y) is the element value of the binary mask at position (x, y), d is a predetermined value, u is a predetermined scalar value, $I_{N1}(X, y)(i)$ is the $i^{th}$ element of the triplet of colour of $I_{N1}(X, y)$ and $I_{N2}'(x, y)(i)$ is the $i^{th}$ element of the triplet of colours of $I_{N2}'(x, y)$, i is an indicia of a channel colour.

5. Method according to claim 4, wherein d=0.8 and μ=0.4.

6. Method according to claim 4, wherein the second term is determined according to the following formula:

$$\sum_{(x,y)\in L} \sum_{(x',y')\in N(x,y)} v(M(x,y), M(x',y'))$$

With $$v(l_1, l_2) = \begin{cases} \varepsilon & \text{if } l_1 \neq l_2 \\ 0 & \text{otherwise} \end{cases}$$

Wherein N(x, y) is the 4-neighborhood of position (x,y) and c is a predetermined value.

7. Method according to claim 6, wherein c=0.4.

8. Method according to claim 4, wherein for each of the determined connected components, the score is determined according to the following formula:

$$\text{score}'(CC_k) = \sum_{(x,y)\in CC_k} d_{color}(I_{N1}(x,y), I'_{2N}(x,y))$$

Wherein $CC_k$ is the k-th connected component.

9. Device for detecting differences between two images, wherein the device comprises:

means for transforming the images by resizing the images in order to get identical image sizes, by aligning pixels of the images and by normalizing colours of the images, means for determining plural binary masks from the pixels of the transformed images, each binary mask being composed of one element per couple of pixels of the transformed images having same coordinates in the images, means for determining plural energy functions, each energy function being the sum of a first term which is representative of the transformed images and of one binary mask and of a second term which is only dependent on said one binary mask, means for minimizing the energy function over other plural energy functions, means for selecting the binary mask corresponding to the minimized energy function, each element value being representative of the difference or not of the pixel values of the couple of pixels.

10. A non-transitory computer readable storage medium that stores a computer program comprising program code instructions which, when loaded in and run by a programmable device, causes said programmable device to implement the method according to claim 1.

* * * * *